United States Patent [19]
Fukukawa et al.

[11] Patent Number: 4,764,657
[45] Date of Patent: Aug. 16, 1988

[54] AUTOMATIC TAB PLATE WELDING APPARATUS

[75] Inventors: Yoshitsugu Fukukawa; Atsushi Nishida, both of Chiba; Katsuhiko Nishioka; Hiroaki Tsunori, both of Hyogo, all of Japan

[73] Assignees: Sumitomo Metal Industries, Ltd., Osaka; Osaka Fujikogyo Co., Ltd., Hyogo, both of Japan

[21] Appl. No.: 23,819

[22] Filed: Mar. 9, 1987

[30] Foreign Application Priority Data

Mar. 31, 1986 [JP] Japan .................. 61-74664

[51] Int. Cl.$^4$ .......................... B23K 9/02; B23K 37/04
[52] U.S. Cl. ................................ 219/125.1; 219/124.1
[58] Field of Search ............... 219/124.1, 124.4, 125.1, 219/136; 228/8–10, 49.1; 901/42

[56] References Cited

U.S. PATENT DOCUMENTS 4,010,346  3/1977  Cecil et al. .................. 219/125.1 X
4,570,049  2/1986  Albert et al. .................. 219/124.1

FOREIGN PATENT DOCUMENTS 0146242 12/1978 Japan .................. 228/10
59-18158  3/1984 Japan .
0017362  1/1986 Japan .................. 219/124.1
1439787  6/1976 United Kingdom .
1597042  9/1981 United Kingdom .

Primary Examiner—E. A. Goldberg
Assistant Examiner—C. M. Sigda
Attorney, Agent, or Firm—Burns, Doane, Swecker & Mathis

[57] ABSTRACT

An automatic tab plate welding apparatus welds a tab plate to the predetermined corner of a plate. A tab plate table supports the tab plate and determines the position of the tab plate relative to the forward direction of the plate, the widthwise direction of the plate, the vertical direction of the top surface of the plate, and the angle of inclination to the top surface of the plate. A welding torch is also positioned in operative association with the positioning of the plate described above.

8 Claims, 15 Drawing Sheets

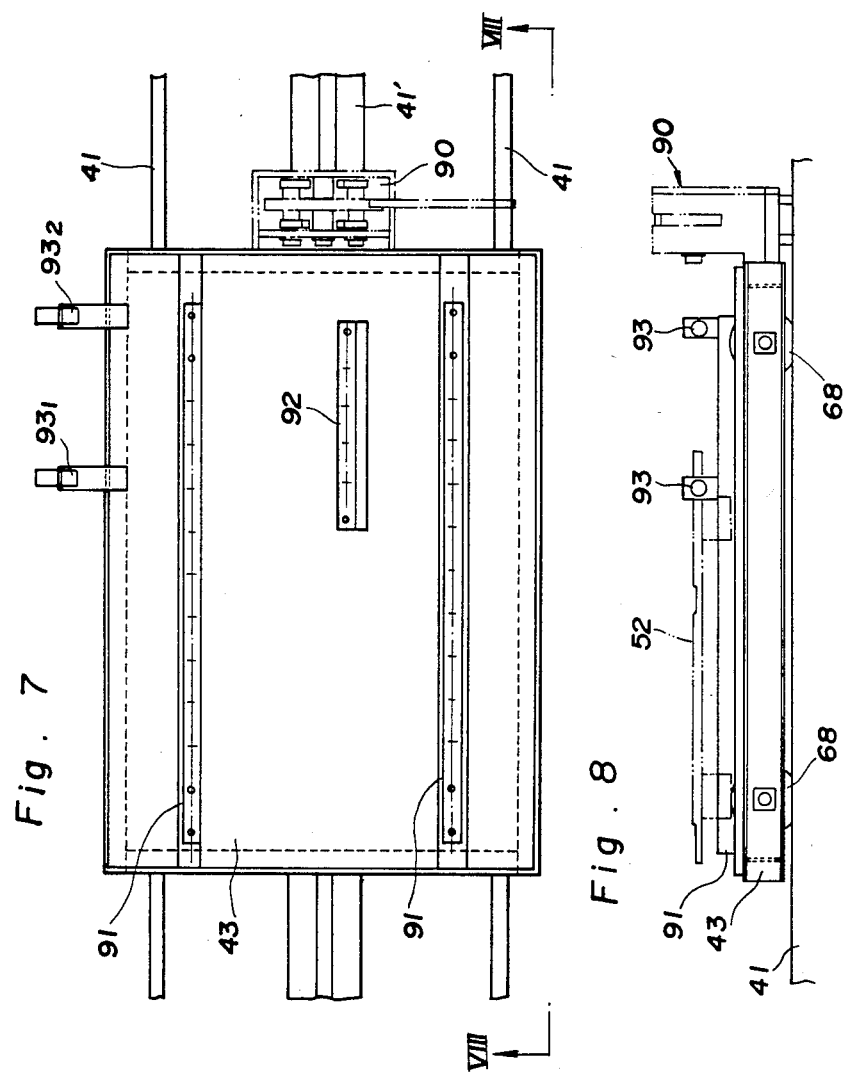

AUTOMATIC TAB PLATE WELDING APPARATUS

BACKGROUND OF THE INVENTION

The present invention relates to an improvement in UOE pipe manufacturing apparatus and, more particularly, to an improved automatic tab plate welding apparatus for welding a tab plate (a small steel piece) to each of four corners of a plate of pipe material (hereinafter called a plate) before the forming of a pipe.

The UOE pipe manufacturing process is widely used in the manufacture of large-diameter welded pipes. In the UOE process, a plate which has been cut to predetermined size is planed on its edges, formed into a U-shaped form in section by a U-ing press, formed into an 0-shaped form in section by an O-ing press, welded along a seam to form a pipe, and expanded and shaped into a large-sized welded steel pipe by an expander inserted thereinto.

In welding along the seam of the pipe formed into the 0-shaped form in section, however, welding defects usually occur at the beginning and at the end of the welding seam. Therefore, tab plates are attached to the ends of the O-shaped pipe before welding so that these welding defects will be confined to the tab plates. However, the manual operation of attaching these tab plates is dangerous and requires fairly high skill.

Accordingly, a method of forming portions corresponding to these tab plates in the plate in advance was proposed in United Kingdom Pat. No. 1,439,787. Even though this method has made the tab plate attaching operation unnecessary, it has the disadvantage that yield is decreased due to the necessity to provide cuts or notches at the ends of the plate.

On the other hand, the present applicant disclosed a method of welding a tab plate to each of four corners of a plate before the pressing step and thereafter performing pressing and welding steps (Japanese Patent Publication No. 18158/84 Official Gazette). Next, the applicant disclosed an invention entitled "Automatic Tab Plate Welding Apparatus" (Japanese Patent Public Disclosure No. 17362/86 Official Gazette) for carrying out the previously disclosed method.

Said automatic tab plate welding apparatus has, as shown in FIGS. 20 and 21, four welding devices 1 which are disposed in twos on both sides of a pass line of a plate A and which are adapted to approach the four corners of the plate A resting on the pass line from the sides and thereby to weld tab plates B to the corners. Each of the welding devices 1 runs with wheels 36 on parallel rails 35 laid at right angles to the direction of passage of the plate A shown by an arrow and approaches the plate A which has stopped and rests on the rails. A lower bedplate 32 having the wheels 36 is provided in the rear part thereof with a tab plate store box 7 for storing a plurality of tab plates B and a tab plate feeding device 8 for attracting one of the tab plates in the store box 7 and feeding it to a tab-plate positioning table 22 as will be described in detail hereinbelow.

The lower bedplate 32 is provided on the front part thereof with parallel rails 34 and an intermediate bedplate 31 slidable forward and backward along the rails 34 on the lower bedplate. The intermediate bedplate 31 is likewise provided thereon with parallel rails 33 and an upper bedplate 30 slidable sideways along the rails 33 on the intermediate bedplate 31, that is in the direction parallel to the side end face of the plate A.

The upper bedplate 30 is provided thereon with all the essential devices such as a welder 11 having a vertical pair of welding torches 12, mounts 13 therefor, and a wire feeding device 3, a clamping device 5 for holding the plate from above and below, the tab plate positioning table 22, and a tab plate setting device 6 for fixing the tab plate B on the tab plate positioning table 22.

The welding device 1 runs with the lower bedplate 32 to the neighborhood of the plate A and stops there. The intermediate bedplate 31 moves forward from there and stops at the position at which a holding plate 23 disposed on a side end face of the tab plate positioning table 22 abuts against a side end face of the plate A. Then, the upper bedplate 30 slides along the side end face of the plate A (obliquely toward the upper left corner of FIG. 20) and stops at the position at which a stopper 19 disposed on the forward end of the tab plate positioning table 22 abuts against the forward end of the plate A. In this manner, the tab plate positioning table 22 is properly positioned and the plate A is clamped by the clamping device 5. Then, the tab plate B which has been supplied and placed on said table 22 by the tab plate feeding device 8 is tightly urged and clamped to the holding plate 23 and the forward end of the plate A by the action of urging blocks 26 and 27 constituting the tab plate setting device 6, and, thereafter, welding is started.

Since the mounts 13 for the welding torches 12 are vertically and horizontally slidable along the side walls of the welder 11, the welding torches 12 can be adjusted in height and move parallel along the welding line to automatically weld the tab plates B to the corners of the plate A.

However, service experience and on-line tests have shown that the conventional automatic tab plate welding apparatus described above has certain problems as follows:

(i) Since the weight of the welding device 1 as a whole is too large, the lower, intermediate and upper bedplates 32, 31 and 30 cannot be moved smoothly.

(ii) While a vertical pair of welding torches 12 facing upward and downward, respectively, are used, the upward welding torch 12 is very unstable and ill-suited for a mass production line (when welded from above and below without providing adequate beveling, sufficient depth of penetration is not obtainable and, particularly in thick tab plates, sufficient coupling strength is not obtainable either).

(iii) The entire production line must be stopped each time the tab plates B are supplied to the tab plate store box 7 or the store box 7 is exchanged.

(iv) Since the amount of movement of the welding torches 12, that is the welding length, is fixed, only tab plates of this fixed width can be used with the welding apparatus.

Accordingly, an object of the present invention is to provide an automatic tab plate welding apparatus in which all of the problems of the conventional apparatus described above can be obviated.

SUMMARY OF THE INVENTION

The automatic tab plate welding apparatus according to the present invention comprises uneven parallel rails laid above and below the pass line for the plate and perpendicular to the pass line, a truck which is movable forward and backward on the upper rails, and a basic truck which is movable forward and backward on the lower rails.

Disposed on the top of the truck on the lower rails are a plurality of tab plate store boxes which can be interchanged in position by a turn-table, and a tab plate feeding device for attracting the tab plates in the tab plate store box one by one and feeding them to the basic truck on the lower rails. Disposed on the side end face of the truck are an urging cylinder for holding down a corner of the plate, preventing it from bending upward, and a driving device for moving a guide rail which extends horizontally in front of said side face in the direction parallel to said side end face, thereby moving a welding torch depending from a vertically moving unit housing which is slidable in the top face thereof with the guide rail along the welding line.

Disposed on the basic truck on the lower rails is a tab plate setting device comprising a first slide base 52 which is movable on the basic truck in the same direction therewith and which is stopped from moving when a stopper rod provided upright on the top face thereof abuts against a side end face of the plate; a second slide base 54 which is movable on the first slide base perpendicularly to the direction of movement thereof and which is stopped from moving when an extensible stopper rod provided upright on the top surface thereof abuts against a front or rear end face of the plate; a vertically movable tab plate table disposed on the second slide base and carrying a tab plate which is supplied from the truck on the upper rails and positioned flat by virtue of the first and second slide base moving forward and standing still; two columns of forwardly inclining vertical rolls for holding the tab plate on the tab plate table, matching a side end face of the tab plate with the forward side face of the stopper rod, and measuring the width of the tab plate, one of said two columns being movable toward and away from the other; a pusher for pushing the tab plate on the tab plate table from behind and against the front end face of the plate; a revolving hammer having a gate hammer disposed across the welding line for striking ends of both the plate and tab plate to correct the difference in level therebetween; and an air cylinder for rearwardly inclining the tab plate table as a whole.

Disposed on the second slide base is a guide bar extending across and above the tab plate table and projecting forwardly of the first slide base. By inserting the guide bar between horizontal rollers of a connecting bar projecting from the vertically moving unit housing of the welding torch, it is made possible to move the housing along a guide rail as the second slide base moves, whereby the welding torch is guided to the welding line. The guide bar is provided with proximity switches and the connecting bar is provided with a striker, thereby informing the welding torch moving along the welding line of the start point of welding.

As described above, the automatic tab plate welding apparatus according to the present invention is divided mainly into the upper truck side on which the tab plate feeding device, the welding torch and others are provided and the lower basic truck side on which only the tab plate setting device is provided. Accordingly, the lower basic truck, the first slide base and the second slide base corresponding respectively to the lower bedplate, the intermediate bedplate and the upper bedplate of the conventional apparatus described with reference to FIGS. 20 and 21 bear loads of relatively small weight, thereby facilitating easy and smooth operation of these portions, such as movement on the rails.

In the automatic tab plate welding apparatus according to the present invention, since the unstable upward facing welding torch is disused and only the downward facing welding torch is used, stable and reliable weldability is always obtained irrespective of variation in thickness of the tab plates.

Further, since a plurality of tab plate store boxes are provided and can be exchanged with one another by rotating the turn table, the tab plate store box being used can be instantly exchanged with one of the other boxes when it becomes empty on rotating the turn table, without the need for stopping the production line.

Further, it is possible to use tab plates with a variety of widths randomly since an encoder is incorporated in the tab plate table, whereby the width of a tab plate held by the vertical rolls can be measured and the amount of movement of the welding torch can be adjusted each time.

BRIEF DESCRIPTION OF THE DRAWINGS

The invention will be better understood from the following description, taken in connection with the accompanying drawings, in which:

FIG. 7 is a plan view of a basic truck on the lower rails;

FIG. 8 is a side view taken along the line VIII—VIII of FIG. 7;

DESCRIPTION OF THE PREFERRED EMBODIMENT

An embodiment of the automatic tab plate welding apparatus according to the present invention will now be described in detail with reference to FIGS. 1 to 19.

Figure 1:
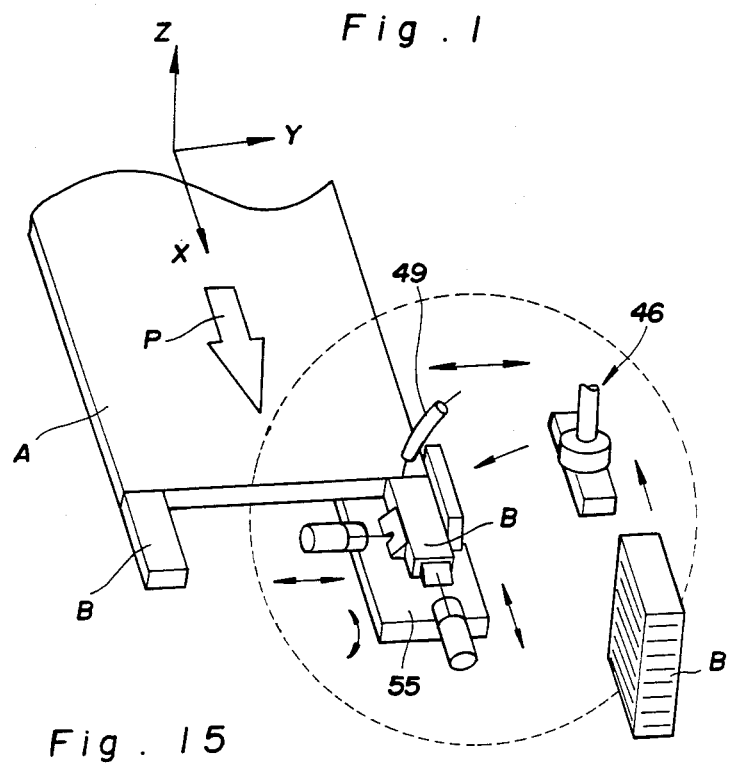
FIG. 1 is a perspective view illustrating the operation of an automatic tab plate welding apparatus according to the present invention.

The operation of the automatic tab plate welding apparatus according to the present invention is schematically shown in FIG. 1. A tab plate B is connected to each of both sides on each of both longitudinal end faces of a plate A. The apparatus according to the present invention is for connecting one tab plate B to one predetermined corner of the plate A. By simultaneously operating four identical apparatuses disposed at the predetermined positions, four tab plates can be respectively connected to the four predetermined corners of the plate A at one time. In the following explanation, however, only one apparatus will be described for convenience' sake.

One of the tab plates B piled up at a predetermined place is held by a tab plate feeding device 46 and put on a tab plate table 55 standing by at a predetermined position. The tab plate table 55 brings the tab plate B into abutment with a predetermined corner of the plate A which is standing by at the predetermined position and positions it accurately. Thereafter, a welding torch 49 welds the tab plate B to the plate A.

In a three dimensional rectangular coordinate system, a pass line P of the plate A is the X axis, the widthwise direction of the plate A is the Y axis, and the direction perpendicular to the top face of the plate A is the Z axis. Then, the tab plate table 55 is capable of positioning the tab plate B with respect to X, Y and Z axes and determining the angle of inclination of the tab plate B about Y axis with respect to the X-Y plane (the top face of the plate A).

The welding torch is also positioned in connection with the positioning of the tab plate.

Figure 2:
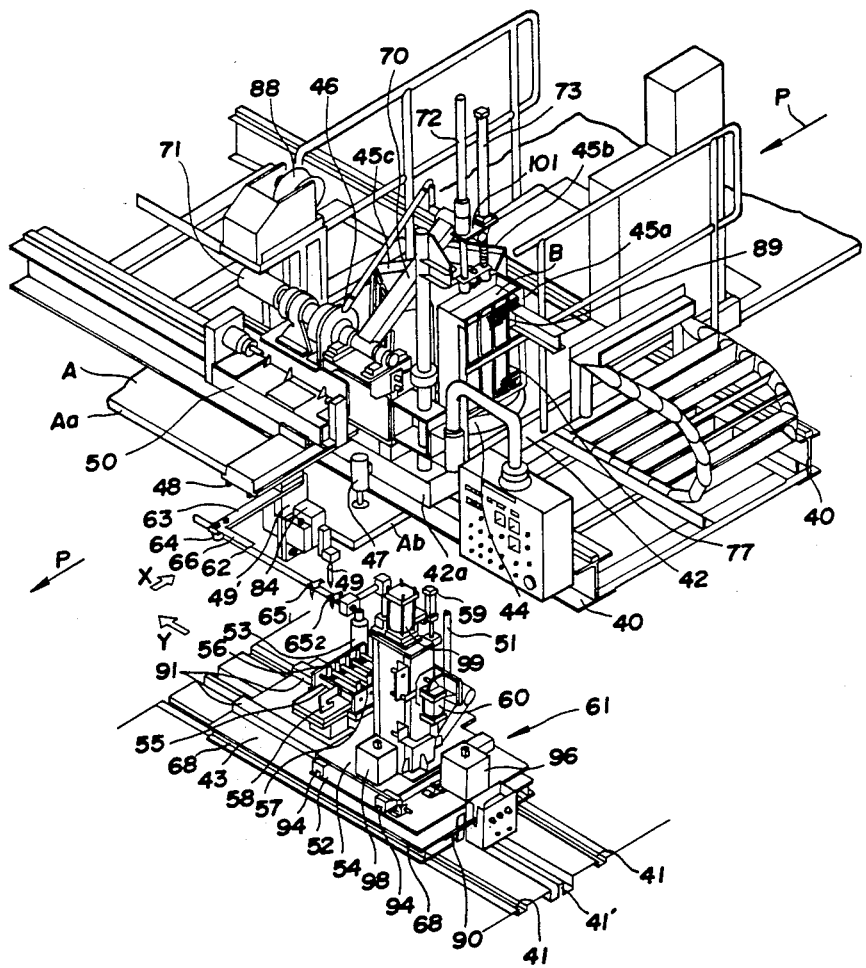
FIG. 2 is a perspective view of the apparatus according to the present invention.

With reference now to FIG. 2, the construction of the apparatus according to the present invention will be described in greater detail.

FIG. 2 is a perspective view showing in detail the entire construction of the automatic tab plate welding apparatus according to the present invention. As shown, the present apparatus comprises uneven parallel rails 40, 41 laid with the pass line P for the plate A therebetween and perpendicular to the pass line P, a truck 42 which is movable forward and backward on the upper rails 40 by wheels 67 (see FIG. 4), and a basic truck 43 which is movable forward and backward on the lower rails 41 by wheels 68 (see FIG. 8).

Disposed on the truck 42 are a plurality of tab plate store boxes 45a, 45b and 45c mounted on a turn table 44, the tab plate feeding device 46 for attracting one of the tab plates B in the tab plate store box and feeding it onto the tab plate table 55 on the basic truck 43 by swinging movement of an arm 70, an urging cylinder 47 for urging the plate A downwardly, a torch driving device 50 for driving the welding torch 49 along the welding line, and a wire reel 88 for the welding torch 49.

Disposed on the basic truck 43 is a tab plate setting device 61 comprising the first slide base 52 slidable thereon forwardly and backwardly in the direction denoted by an arrow Y along guide rails 91, the second slide base 54 movable on the first slide base 52 forwardly and backwardly in the direction denoted by an arrow X along guide rails 94, and the vertically movable tab plate setting table 55 on which the tab plate B supplied by the tab plate feeding device 46 is placed.

Figure 3:
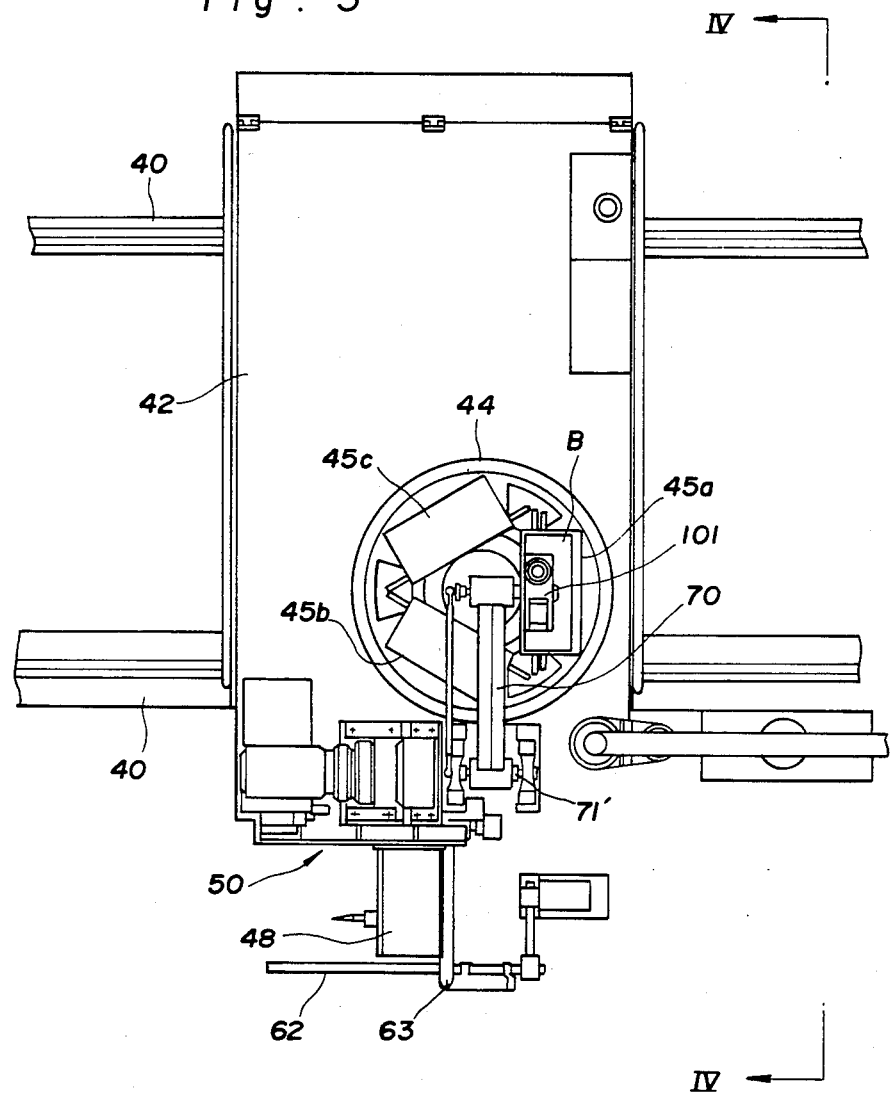
FIG. 3. is a plan view of a truck on the upper rails.
Figure 4:
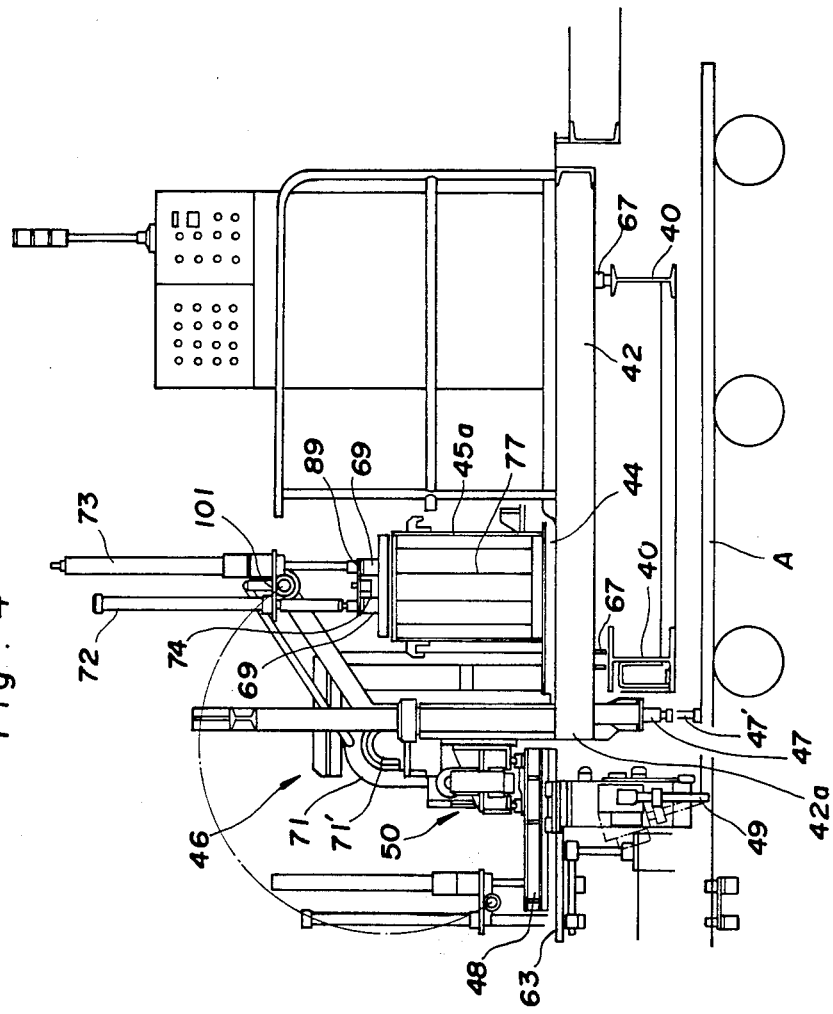
FIG. 4 is a side view taken along the line IV—IV of FIG. 3.

The three tab plate store boxes 45a, 45b and 45c are of box-like shape and are opened at the top and front with a detachable grating 77 in front. These boxes are set on the turn table 44, as shown in FIGS. 3 and 4, which is rotatable in the clockwise and anticlockwise directions. By rotating the turn table 44, the position of the store boxes 45a, 45b and 45c can be interchanged. Accordingly, when the presently used store box (for example, 45a) placed underneath an electromagnet 69 (which will be described hereinbelow) becomes empty, it can be instantly replaced by either one of the other store boxes 45b and 45c which are filled with the tab plates, without the need for stopping the entire production line.

The tab plates B in the store boxes 45a, 45b and 45c are removed one by one by the tab plate feeding device 46 which causes the electromagnet 69 to approach the top opening of the tab plate store box 45a to attract one of the tab plates B and carries it onto the tab plate table 55 of the basic truck 43. The device 46 comprises the electromagnet 69 attached to an air cylinder 72, the parallelogramic link arm 70 supporting the air cylinder 72 in a constantly vertical manner, and a source of driving force 71 for swinging the arm 70.

The electromagnet 69 is attached to the end of the rod of the air cylinder 72 through a mount plate 89 so as to move downward into the store box 45a to attract the tab plate B by extending the rod and to move upward from within the store box 45a by retreating the rod.

The air cylinder 72 is, as shown in FIG. 4, secured to a horizontally positioned plate 101 on the top end side of the parallelogramic link arm 70 which is connected at its lower end to a shaft 71' of the source of driving force 71 for swinging. By actuating the source of driving force 71, the arm 70 swings about the shaft 71' toward the basic truck 43 by 180° with the length of the arm as the radius, thereby carrying the tab plate B attracted by the electromagnet 69 toward the basic truck 43. By reversing the source of driving force 71, the arm 70 swings reversely to return the electromagnet 69 to the position above the store box 45a.

In the illustrated embodiment, a guide bar rod 73 is disposed by the side of the air cylinder 72. The guide bar rod 73 has an electromagnet 69 attached to the lower end thereof through the amount plate 89 for increasing the stability of the tab plate B while it is being attracted and carried. The guide bar rod 73 is connected at its lower end to the tip end of the rod of the air cylinder 72 through the amount plate 89 so as to be vertically moved through the horizontally positioned plate 101 in interlinked fashion with the movement of the air cylinder 72.

Disposed downwardly in the neighborhood of the electromagnet 69 is a proximity switch 74 for detecting the presence of the tab plate B that is to be attracted. When the tab plate B is detected, the switch 74 applies an electric current to the energizing coil of the electromagnet 69 to attract the tab plate B thereto. During the period when no tab plate B is detected, the electromagnet 69 is raised to the original position and the turn table 44 is rotated to exchange the empty tab plate store box with the other store box which is filled with the tab plates B.

Disposed on a side face 42a of the truck 42 above the basic truck 43 is the urging cylinder 47 comprising an air cylinder and a disk 47' attached to the end of a rod of the air cylinder. The urging cylinder 47 urges the top surface of a corner of the plate A downward by means of the disk 47' thereof, thereby preventing the corner of the plate A from bending upwardly.

Figure 5:
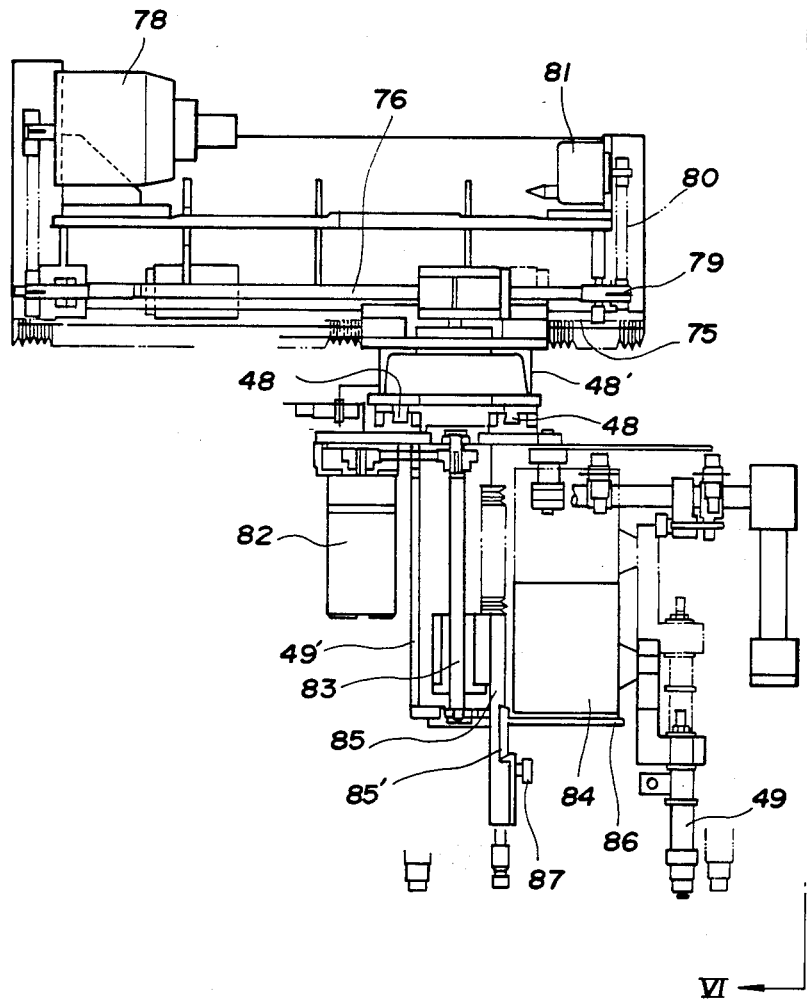
FIG. 5 is a side view of a torch driving device.
Figure 6:
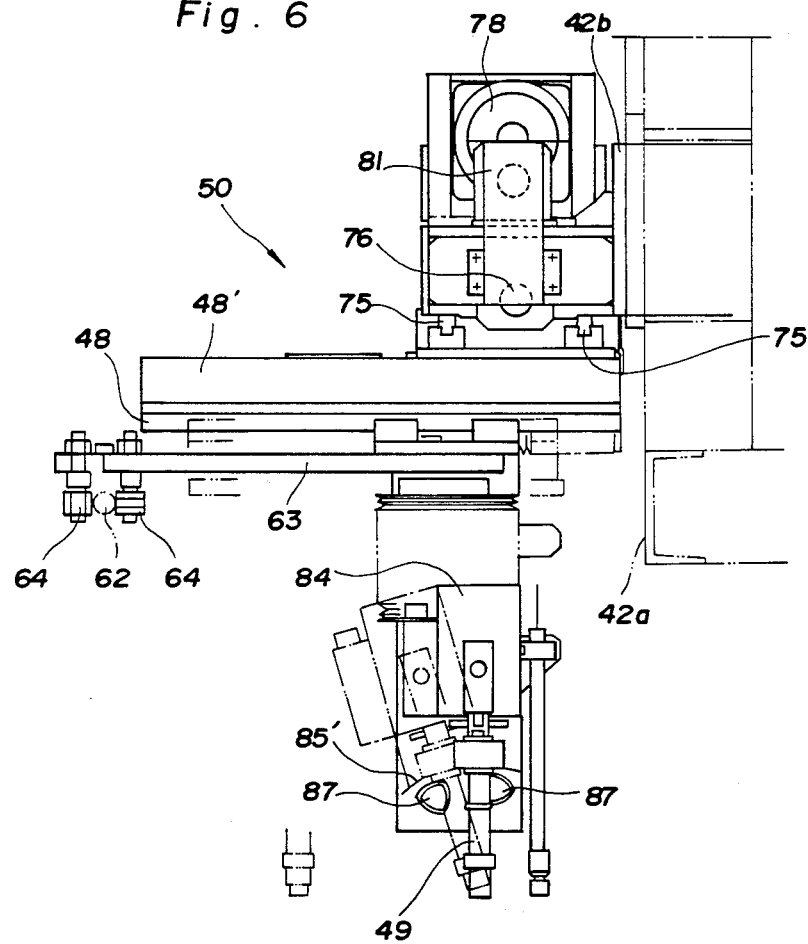
FIG. 6 is a front view taken along the line VI—VI of FIG. 5.

Disposed also on the side face 42a of the truck 42 is the torch driving device 50 for moving the welding torch 49 along the welding line. The torch driving device 50 comprises, as shown in FIGS. 5 and 6, rails 75 disposed parallel to the side face 42a of the truck 42 through a bracket member 42b projecting from the side face 42a, a threaded shaft 76, a torch driving motor 78 for rotating the threaded shaft 76, a movable block 48' engaged with the rails 75 and in threadable engagement with the threaded shaft 76, and guide rails 48 provided in the working block 48'. The welding torch 49 is moved along the welding line by rotating the driving motor 78 and moving the guide rails 48 along the rails 75.

Mounted through a synchronous pulley 79 and a synchronous belt 80 to the other end of the threaded shaft 76, which is rotated by the torch driving motor 78, is an encoder 81 for measuring the distance of movement of the welding torch 49 by the number of times it rotates. The value obtained by this measurement is used as a feedback signal in controlling the movement of the welding torch 49.

The guide rails 48 are laid on the underside of the movable block 48' having means for engagement with the rails 75 and threadable engagement with the threaded shaft 76 of the torch driving device 50 and extends horizontally toward the basic truck 43. The welding torch 49 is vertically movably and inclinably provided downward of the front face of a housing 49' depending from the guide rails 48.

The housing 49' from which the welding torch 49 depends has a threaded shaft 83 disposed upright therewithin and rotated by a power source 82. Threadably engaged with the threaded shaft 83 is a back plate 85 of a weaver bracket 84 having the welding torch 49 attached thereto, so that the welding torch 49 is vertically moved by rotating the threaded shaft 83. The weaver bracket 84 is for weaving the welding torch 49 (that is, moving the welding torch to the right and left substantially perpendicularly to the welding direction).

By loosening a bolt 87, the attachment of a fixed plate 86 of the weaver bracket 84 to the back plate 85 is loosened, thereby allowing the entire welding torch 49 to be inclined as shown by phantom lines (FIG. 6) along an arcuate dovetail groove 85' defined in the front face of the back plate 85. By this construction, the welding torch 49 can be adjusted in angle to fit the shape of beveling.

A reel 88 for wire to be supplied to the welding torch 49 is disposed on the truck 42.

While various welding processes such as TIG welding, MAG welding, $CO_2$ welding and others may be employed with the welding torch 49, pulse welding is employed in the present embodiment to allow for less sputtering and easier control of weld penetration and excess metal. Disposed on the vertically moving unit housing 49' of the welding torch 49 which depends from the guide rails 48 is a connecting bar 63 extending forwardly in the horizontal direction (in the direction of X axis). Disposed on the underside of an end of the connecting bar 63 are horizontal rollers 64 for holding therebetween a guide bar 62 (see FIG. 2) from the side of the basic truck 43.

On the other hand, as shown in FIGS. 7 and 8, the basic truck 43 which is movable on the rails 41 by means of the wheels 68 has a clamp lever 90 on the rear side. The clamp lever 90 is for holding and releasing a clamping rail 41' formed centrally between the rails 41. Movement of the basic truck 43 is completely locked when the clamp lever 90 holds the clamping rail 41'.

Formed on the top surface of the basic truck 43 are parallel guide rails 91 disposed in the same direction as the lower rails 41, and disposed centrally between the parallel guide rails 91 is a rack 92 parallel to the guide rails 91.

Disposed on a side of the basic truck 43 are two proximity switches $93_1$ and $93_2$ which are spaced a predetermined distance from each other and extend toward the guide rails 91. The proximity switch $93_1$ at the forward position is used to stop the first slide base 52 at the forward limit and the proximity switch $93_2$ at the backward position is used to stop it at the backward limit.

Figure 9:
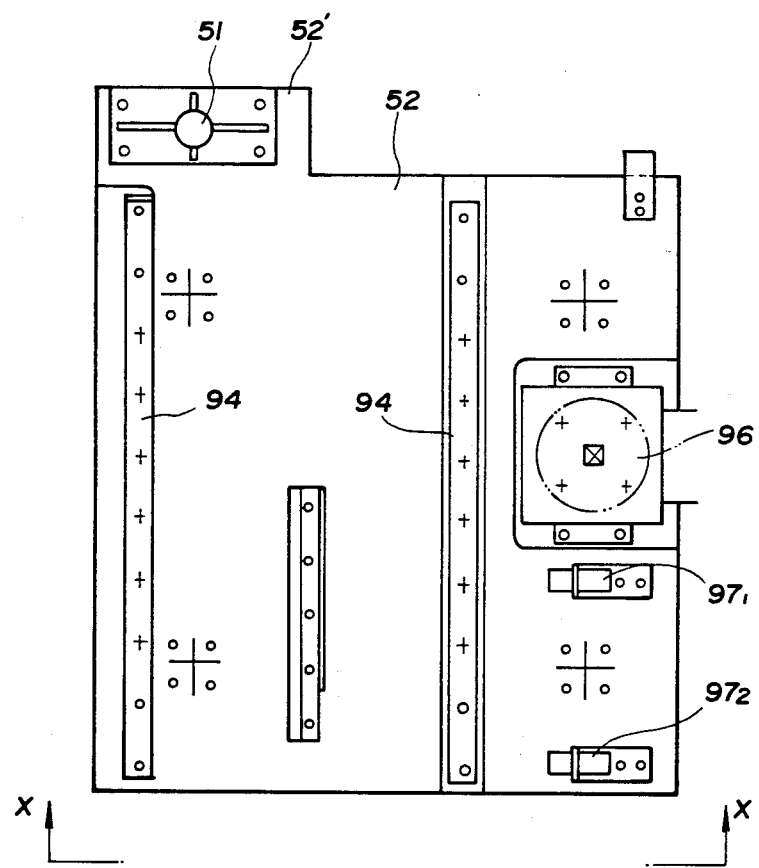
FIG. 9 is a plan view of a first slide base.
Figure 10:
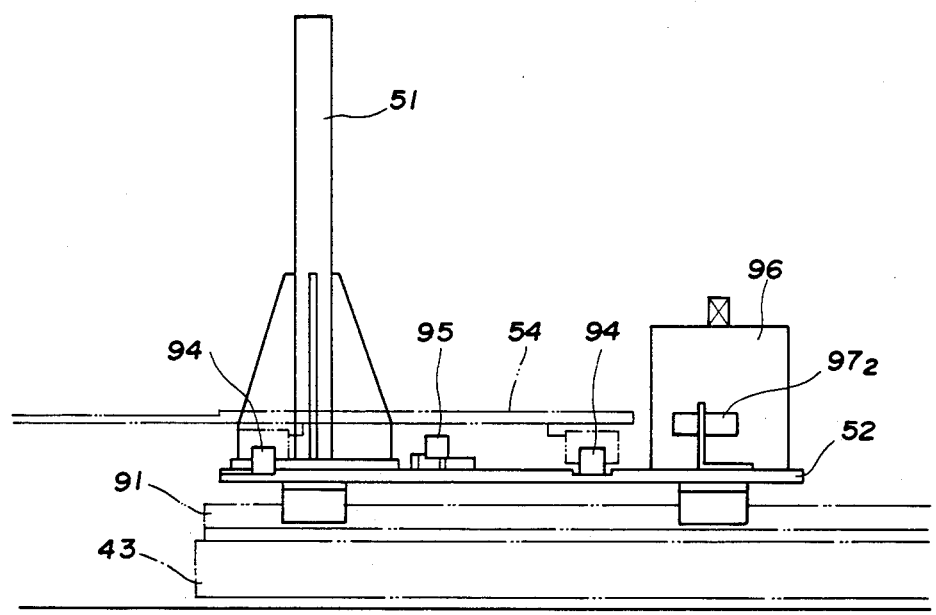
FIG. 10 is a side view taken along the line X—X of FIG. 9.

The first slide base 52 rests on the parallel guide rails 91 on the basic truck 43 with the underside thereof slidably engaging with the rails 91. Formed in the front portion of the first slide base 52 are, as shown in FIGS. 9 and 10, parallel guide rails 94 which are perpendicular to (in the direction of X axis) the parallel guide rails 91 on the basic truck 43. Formed centrally between the guide rails 94, as in the basic truck 43, is a rack 95 which is parallel to the guide rails 94.

Figure 14:
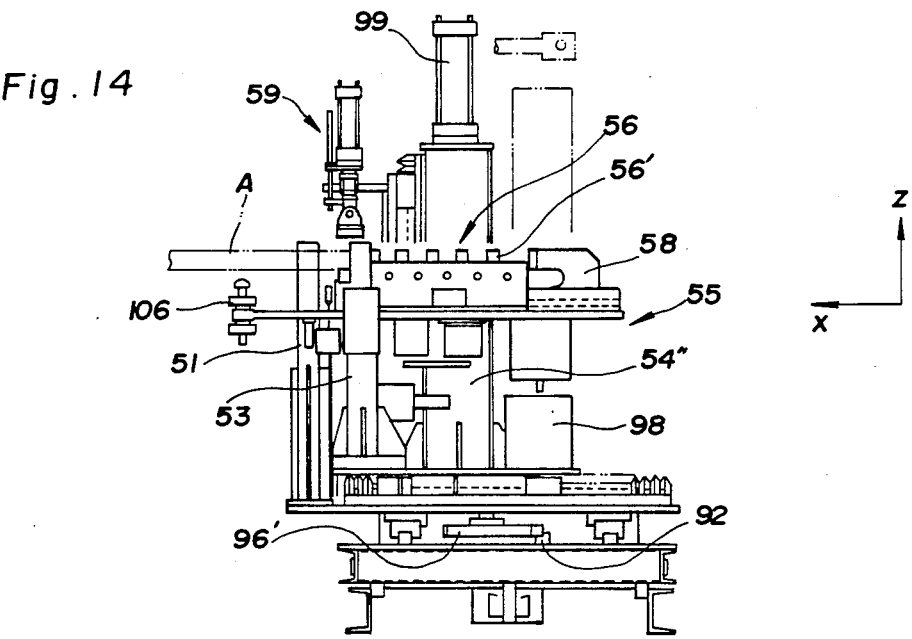
FIG. 14 is a side view taken along the line XIV—XIV of FIG. 13.

Mounted on the rear portion of the first slide base 52 is a rotary cylinder 96 having a rotary gear 96' which is positioned on the underside of the first slide base and in meshing engagement with the rack 92 on the basic truck 43 (see FIG. 14). By rotating the rotary gear 96' forwardly or reversely, the first slide base 52 is moved forward and backward in the direction of X axis (parallel to the front end face Aa of the plate A) along the guide rails 91 on the basic truck 43.

Formed in the right hand corner on the front portion of the first slide base 52 is a projection 52' facing the plate A. The stopper rod 51 stands upright in the projection 52' and is electrically connected to the rotary cylinder 96. When the stopper rod 51 is brought into contact with a side end face Ab of the plate A by forward movement of the first slide base 52 in the direction of Y axis, rotation of the rotary cylinder 96 is stopped, whereby the forward movement of the first slide base 52 is stopped.

Regardless of the presence or absence of contact between the stopper rod 51 and the side end face Ab of the plate A, when the rear end of the first slide base 52 kicks the proximity switch $93_1$ for the purpose of stopping it at the forward limit, the rotation of the rotary cylinder 96 stops, thereby stopping the forward movement of the base 52 and, on the other hand, when the rear end of the first slide base 52 kicks the proximity switch $93_2$ for the purpose of stopping it at the backward limit, the rotation of the rotary cylinder 96 stops, thereby stopping the backward movement of the base 52.

Mounted on the first slide base 52 are a forward limit stopping proximity switch $97_1$ and a backward limit stopping proximity switch $97_2$ for stopping the forward and backward movements, respectively, of the second slide base 54 in the direction of X axis.

The second slide base 54 rests on the parallel guide rails 94 on the first slide base 52 with the underside thereof slidably engaging with the rails 94.

Figure 11:
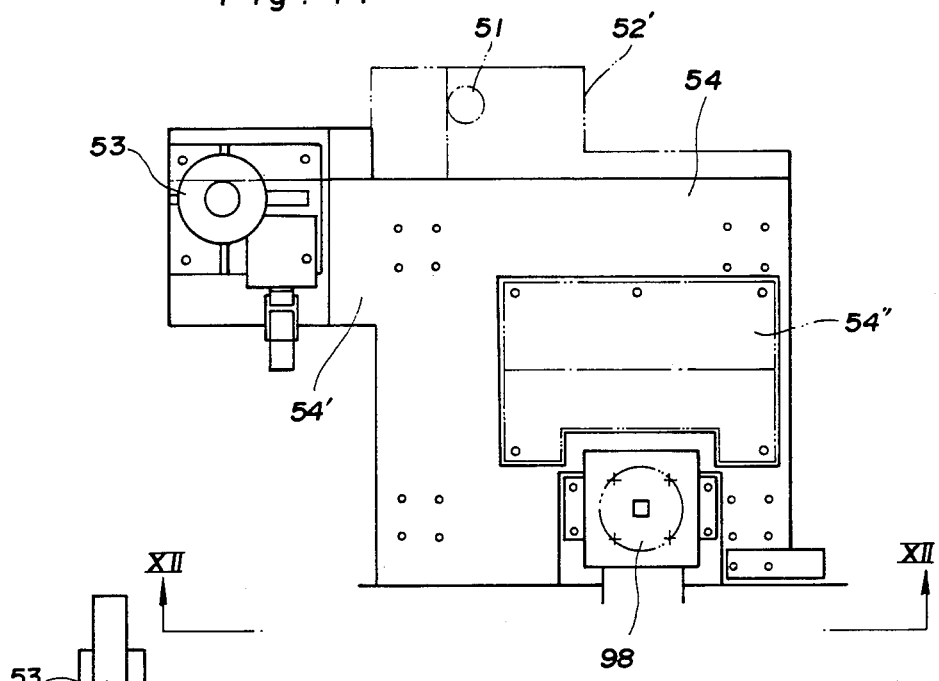
FIG. 11 is a plan view of a second slide base.
Figure 12:
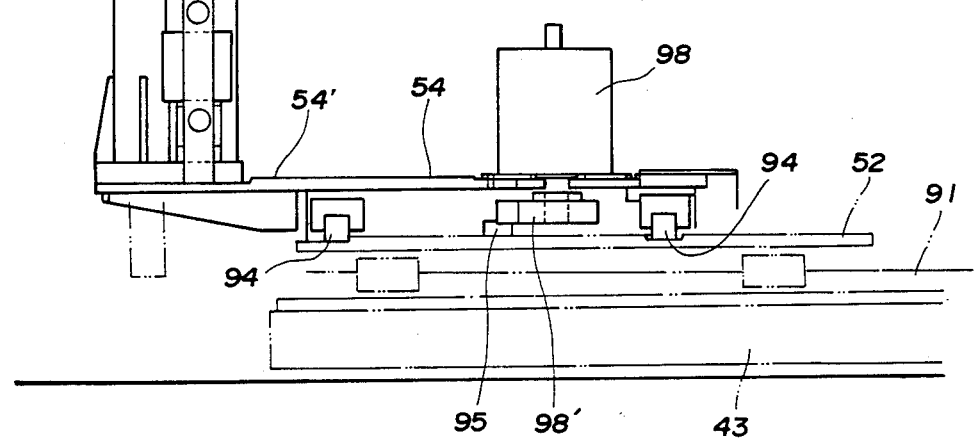
FIG. 12 is a side view taken along the line XII—XII of FIG. 11.

As shown in FIGS. 11 and 12, a rotary cylinder 98 is mounted on the rear portion of the second slide base 54. A rotary gear 98' of the rotary cylinder 98 is positioned on the underside of the second slide base 54 and is in meshing engagement with the rack 95 on the first slide base 52. By rotating the rotary gear 98' forwardly or reversely, the second slide base 54 is moved forward or backward in the direction of X axis along the guide rails 94 on the first slide base 52 toward the front end face Aa of the plate A.

Formed in the left hand corner on the front portion of the second slide base 54 (on the side at which the stopper rod 51 of the first slide base 52 stands) is a projection 54' parallel to the front side face Aa of the plate A. An extensible stopper rod 53 stands upright on the projection 54'. The extensible stopper rod 53 has the upper end extended and retracted by meshing engagement between the rack and the rotary cylinder. When the first slide base 52 and the second slide base 54 are moved simultaneously backward after completion of welding, the stopper rod 53 is retracted so as not to hit the tab plate B which has been welded to the plate A.

The extensible stopper rod 53 is electrically connected to the rotary cylinder 98 for moving the second slide base 54. When the extensible stopper rod 53 is brought into contact with the front end face Aa of the plate A by forward movement of the second slide base 54, rotation of the rotary cylinder 98 is stopped, thereby stopping the forward movement of the second slide base 54.

Figure 15:
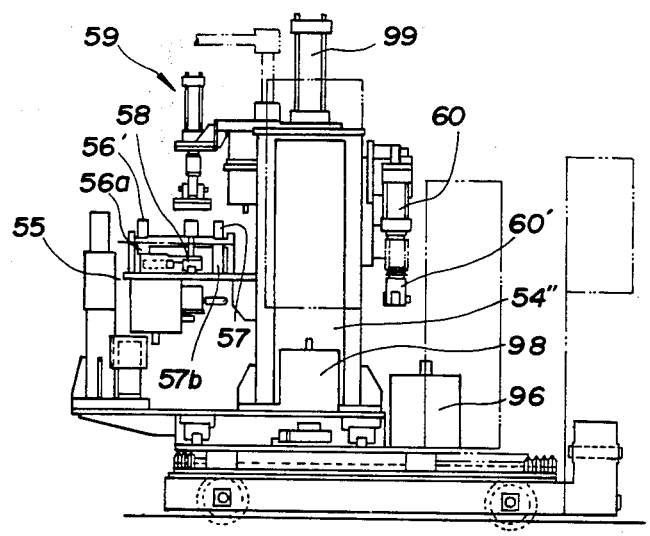
FIG. 15 is a front view taken along the line XV—XV of FIG. 13.
Figure 13:
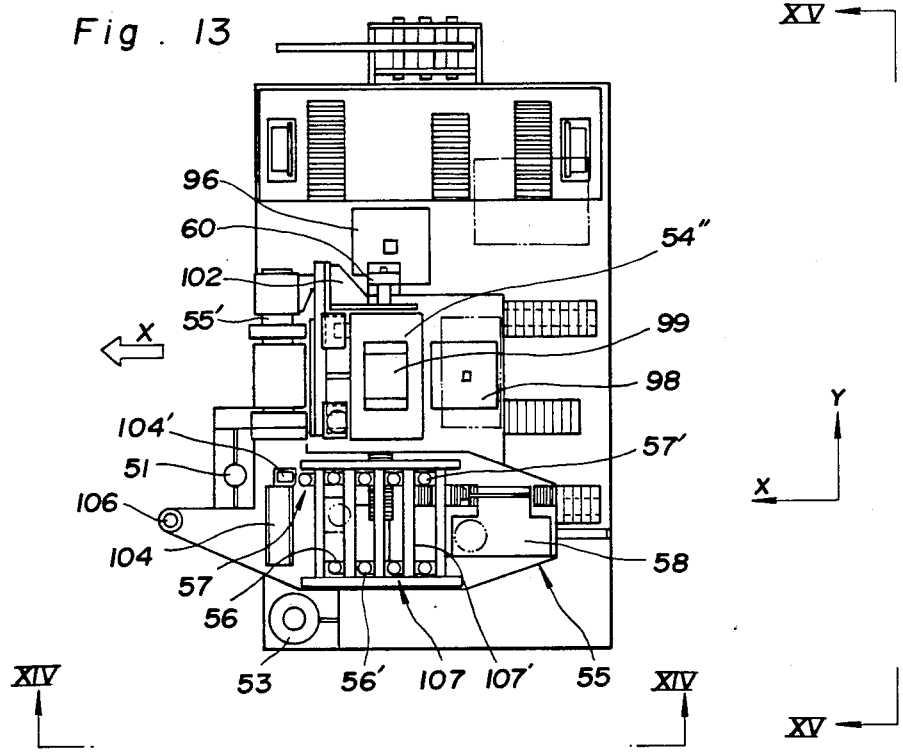
FIG. 13 is a plan view of a tab plate setting device.

Disposed on the projection 54' on the side of the extensible stopper rod 53 is the tab plate table 55 for placing thereon the tab plate B carried from the side of the truck 42. As shown in FIGS. 13 to 15, the tab plate table 55 stands substantially centrally of the second slide base 54 and is moved upward and downward by an air cylinder 99 standing with a rod 99' thereof downward on the upper face of a hollow machine frame 54" opening in the side facing the front end face Aa of the plate A.

Figure 16:
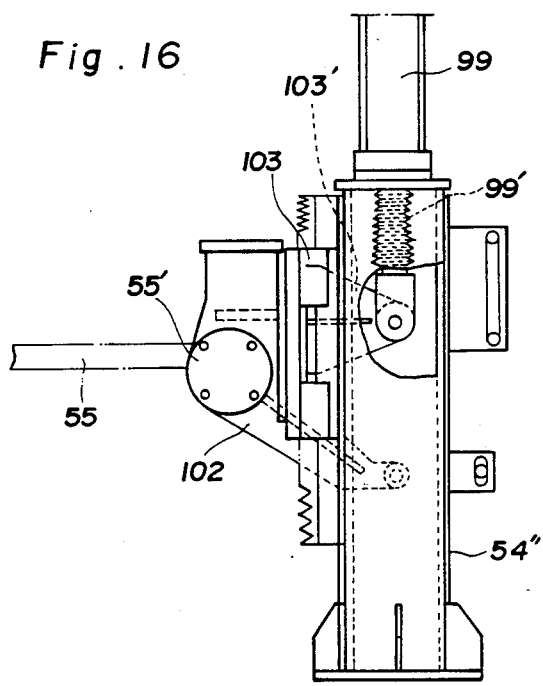
FIG. 16 is a partially cut-away side view of a vertically moving means for a tab plate table.

As best shown in FIGS. 13, 15 and 16, a horizontal shaft 55' is secured to the tab plate table 55 under the front end face Aa of the plate A so as to be parallel to the side end face Ab of the plate A. A connecting piece 103' vertically slidably engaged with the open side of the machine frame 54" and projecting from the back side thereof is connected to the rod 99' of the air cylinder 99 and supports a slider 103. The horizontal shaft 55' is connected by an arm 102 to a small air cylinder 60 having a rod 60' thereof which passed downward through a bracket fixed to a side of the slider 103 so as to be parallel to the side of the machine frame 54". The tab plate table 55 maintains its horizontal position when the rod 60' of the small air cylinder 60 is retracted, and is moved upward and downward by actuation of the air cylinder 99.

Upward movement of the tab plate table 55 is stopped when a holder metal 104 disposed thereon abuts against the reverse side of the plate A. The holder metal 104 is for preventing molten metal from dripping and leaking and is mounted through a holder metal support 105 at a position along the welding line somewhat forward of a roller support 107 for resting thereon the tab plate B on the tab plate table 55 (see FIG. 17). A side holder metal 104' is mounted on the standard side in abutment with the side end face Ab of the plate A.

The tab plate table 55 as a whole can be inclined backward by swinging the shaft 55' of the table 55 by extending the rod 60' of the small air cylinder 60 at the limit of the upward movement of the table 55. This is for providing inverse distortion in advance to prevent the molten metal from shrinking and bending the tab plate B upward after welding is finished.

The angle of inclination can be freely adjusted by changing the length of projection of a bolt 106 attached to the end of the tab plate table 55. The tab plate B carried and rested on the table 55 is, as shown in FIGS. 13 and 14, moved onto the roller support 107 comprising a plurality of parallel rollers 107' provided rotatably longitudinally and by the side of the tab plate table 55. In spaces between the parallel rollers 107', vertical rolls 56' . . . 57' . . . are provided on each of the right and left sides thereof.

Figure 17:
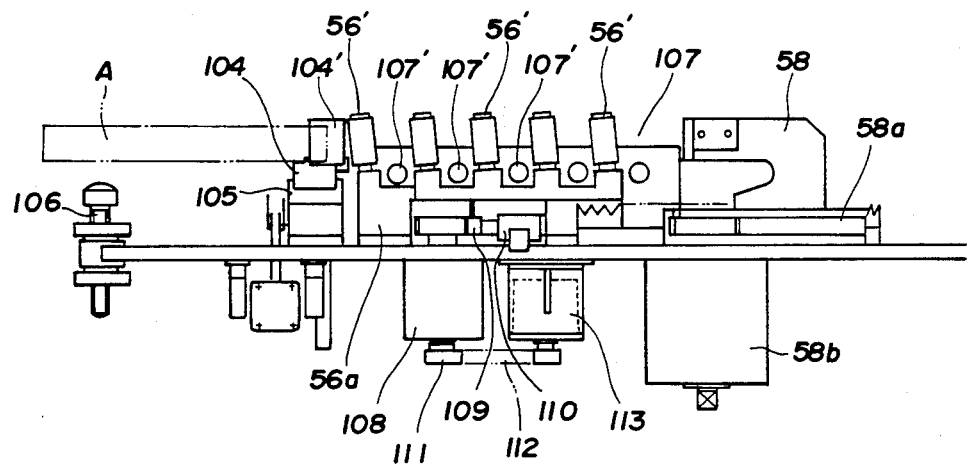
FIG. 17 is a partially cut-away side view of the tab plate table.

The rolls 56' . . . 57' . . . of left vertical roll row 56 and right vertical roll row 57 on the left and right sides, respectively, with respect to the forward direction of the second slide base 54 are rotatably attached to comb-shaped roll support housings 56a and 57b, respectively, engaged with gaps of the parallel rollers 107' with the upper ends of the rolls 56' . . . 57' . . . slightly (about 5°) inclined forward as shown in FIG. 17.

The right vertical roll row 57 serves as the standard for determining the width of the tab plate B. The vertical roll row 57 has its roll support housing 57b fixed to the tab plate table 55 with the peripheral line opposite to the vertical roll row 56 matched with the standard plane of the stopper rod 51. On the other hand, the left vertical roll row 56 has its roll support housing 56a fixed to a slide base 110 slidable on the table 55 widthwise thereof by meshing engagement between a rotary cylinder 108 and a rack 109 and is movable toward and away from the right vertical roll row 57. The tab plate B resting on the roller support 107 is held between the left and right vertical roll rows 56 and 57 by movement of the left vertical roll row 56 and its widthwise position is thereby determined.

Attached through a synchronous pulley 111 and a synchronous belt 112 to the rotary cylinder 108 which moves the left vertical roll row 56 is an encoder 113 for measuring the width of the tab plate B from the number of times the rotary cylinder 108 rotates. The measured value of the width of the tab plate B is used to determine the welding length.

A pusher 58 is disposed behind the roller support 107 of the tab plate table 55. The pusher 58 has a rack 58a attached to the bottom thereof which is in meshing engagement with a rotary cylinder 58b fixed to the tab plate table 55 so as to move forward on the table 55 toward the roller support 107, thereby urging the rear end of the tab plate B on the roller support 107 into abutment with the front end face Aa of the plate A.

As described hereinabove, the left and right vertical rolls 56' . . . 57' . . . holding the tab plate B therebetween are slightly inclined to prevent the tab plate B from being caused to "float" by the urging force of the pusher 58.

Figure 18:
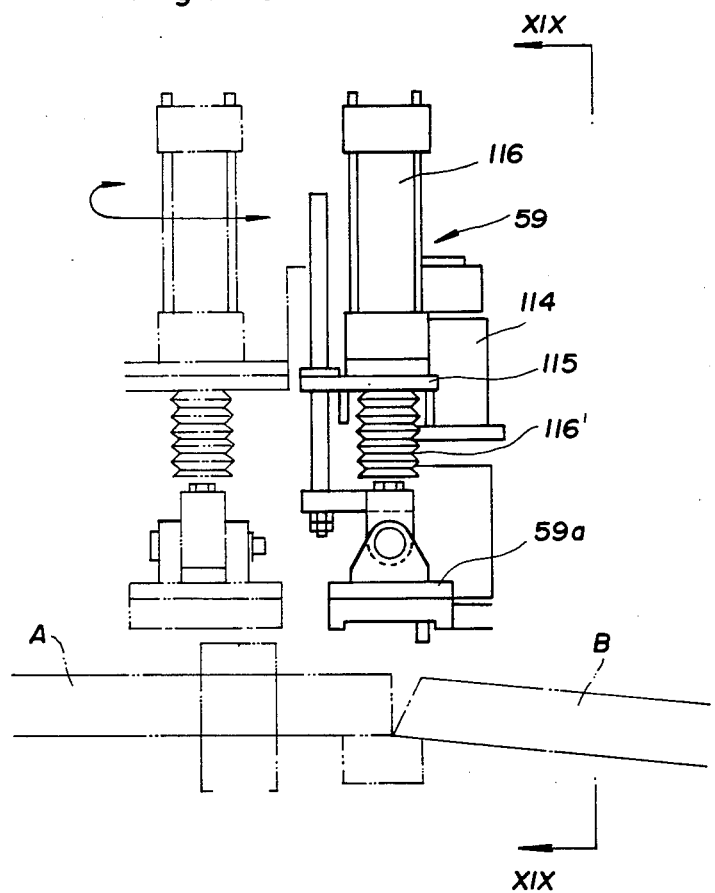
FIG. 18 is a side view of an air hammer.
Figure 19:
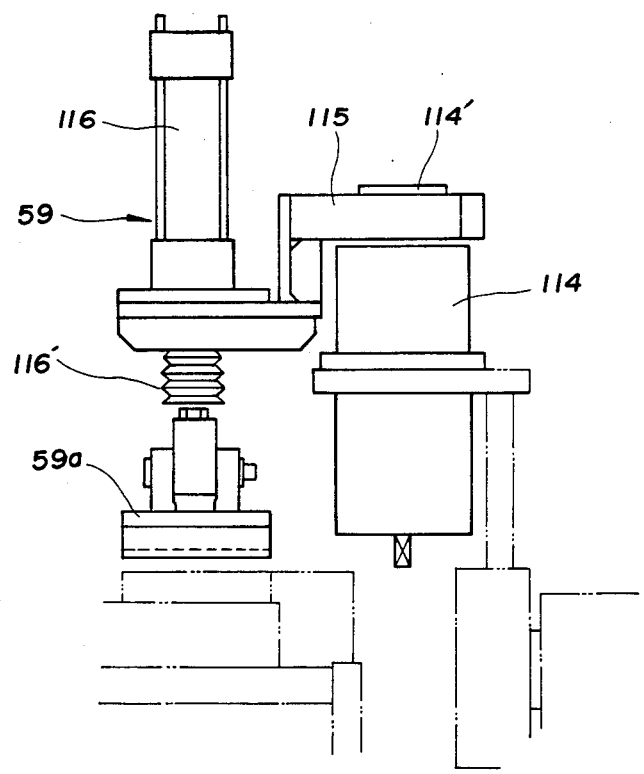
FIG. 19 is a side view taken along the line XIX—XIX of FIG. 18.
Figure 20:
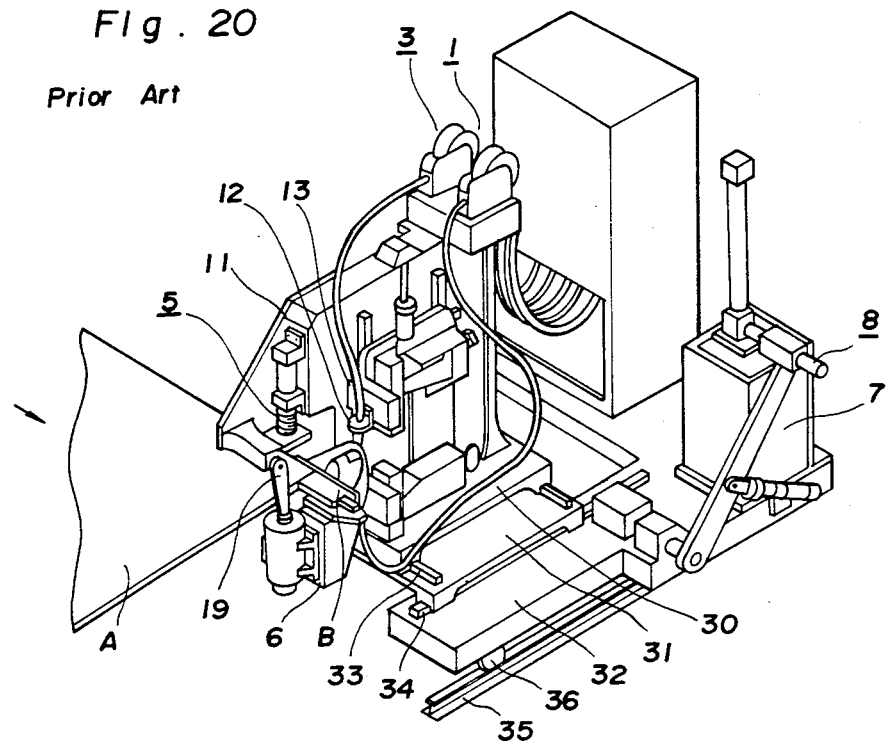
FIG. 20 is a perspective view of a conventional automatic tab plate welding apparatus.
Figure 21:
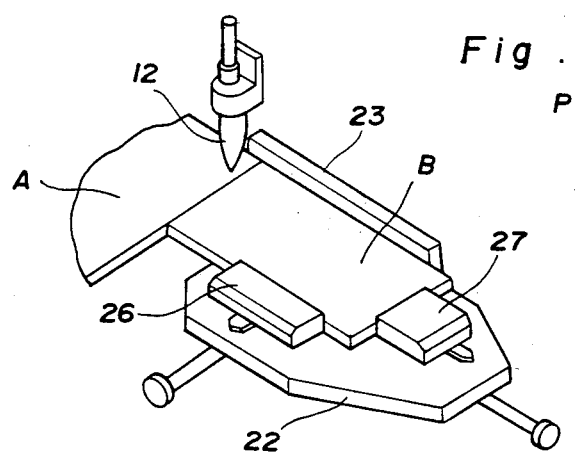
FIG. 21 is an enlarged perspective view of an essential portion of the apparatus shown in FIG. 20.

As shown in FIGS. 18 and 19, a rotary cylinder 114 for revolving an air hammer 59 which will be described hereinbelow in detail is disposed on the top end face of the slider 103 on the side position in the direction of the standard vertical rolls 57 (in the direction of X axis shown in FIG. 13) of the holder metal 104. An end of an arm bracket 115 is secured to a rotary shaft 114' of the rotary cylinder 114, and the air hammer 59 is supported at the other end of the bracket 115. The air hammer 59 comprises an air cylinder 116 and a gate-shaped hammer head 59a secured to an end of a rod of the cylinder 116. By rotating the rotary cylinder 114, the air hammer 59 is revolved onto the holder metal 104 of the tab plate table 55 as shown by an arrow in FIG. 18. The gate-shaped hammer head 59a is attached so as to cross the welding line on the holder metal 104 and caused to strike the plate A and the end face of the tab plate B at the same time by extending and retracting the rod 116', thereby correcting the difference in level between the tab plate B and the plate A when the setting of the tab plate B has been finished. At the time welding is started, the air hammer 59 reverses the revolving direction and retreats from the welding line.

As shown in FIG. 2, an end of a guide bar 62 is secured to the top surface of the machine frame 54". The guide bar 62 is a bar extending parallel to the front end face Aa of the plate A so as to lay across the tab plate table 55. The other end of the guide bar 62 meets at right angles the connecting bar 63 extended forwardly of the housing 49' supporting the welding torch 49 and is inserted and held between the horizontal rollers 64 at the end of the connecting bar 63.

When the forward movement of the second slide base 54 is stopped by the contact of the extensible stopper rod 53 with the front end face Aa of the plate A, the guide bar 62 guides the welding torch 49 to the welding line. When the second slide base 54 is moved backward, the welding torch 49 is pulled by the guide bar 62 and moved in the direction reverse to the direction of arrow $\beta$ on the guide rails 48 to retreat from the welding line.

A striker 66 projecting on the guide bar 62 is disposed at the end of the connecting bar 63, and two proximity switches $65_1$ and $65_2$ are disposed on the guide bar 62. The striker 66 moves on the guide bar 62 as the welding torch 49 moves along the welding line, and kicks the proximity switches $65_1$ and $65_2$.

The striker 66 and the proximity switches $65_1$ and $65_2$ inform the welding torch 49 of the arrival of the start point of welding. Which of the two proximity switches should be used is decided in accordance with the padding number.

The operation of the apparatus according to the present invention will now be described.

The truck 42 and the basic truck 43 are moved on their respective rails 40 and 41, and fixed at positions depending on the width of the plate A carried on the pass line.

While the plate A is being carried on the pass line, the tab plate feeding device 46 is actuated to transfer one of the tab plates B in the tab plate store box 45a to the basic truck 43 and place it on the tab plate table 55.

When the plate A stops within the range of operation of the present apparatus, a tab plate setting command is provided. Then, the vertical roll row 56 moves toward the standard vertical roll row 57. At the time the widthwise position of the tab plate B is decided, the width of the tab plate B is measured by the encoder 113. The appropriate weld length is determined on the basis of the measured value of the width of the tab plate B. The padding number and the start point of welding are predetermined in accordance with the thickness of the plate A.

When the widthwise position of the tab plate B is determined, the first slide base 52 is moved forward until the stopper rod 51 is brought into abutment with the side end face Ab of the plate A, and thereafter the extensible stopper rod 53 is extended and the second slide base 54 is moved forward. When the extensible stopper rod 53 is brought into abutment with the front end face Aa of the plate A and the movement of the second slide base 54 is stopped, the plane positioning of the tab plate B is finished. At this time, the welding torch 49 is guided to the welding line by the guide bar 62.

Then, the tab plate table 55 is moved upward. When the holder metal 104 of the tab plate table 55 is brought into abutment with the reverse side of the plate A and the upward movement of the tab plate table 55 is stopped, the underside of the tab plate B matches the underside of the plate A and, therefore, the heightwise position of the tab plate B is determined. In a case where the plate A is thin, the urging cylinder 47 is actuated to prevent the plate A from bending, before upward movement of the tab plate table 55.

When the heightwise position of the tab plate table 55 has been determined, the small air cylinder 60 is actuated to incline the entire tab plate table 55, and then the pusher 58 is moved forward to tightly urge the tab plate B to the front end face Aa of the plate A.

Then, the air hammer 59 is revolved onto the welding line for hammering. After the difference in level between the plate A and the tab plate B has been corrected, the air hammer 59 is reversely revolved to retreat from the welding line.

Thereafter, the side holder metal 104' is brought into abutment with the standard end which is on the side of the side end face Ab of the plate A. With this, the tab plate B setting operation is completed.

The series of operations described above are all carried out by pneumatic devices which accomplish desired purposes by adequate control of pressure and speed.

When the tab plate B setting operation has been finished, the torch driving device 50 is actuated to move the welding torch 49 along the welding line in the direction reverse to the arrow $\alpha$ to the welding start point which is decided to be on the standard side when the padding number is odd and to be on the opposite side when the padding number is even.

When the welding torch 49 reaches the welding start point, the welding torch 49 is lowered to a suitable level and starts welding. During welding, the weaver 84 is actuated as required and in the case of a multilayer of padding the level of the welding torch 49 is varied according to the layer of padding.

When the welding torch 49 has moved over the predetermined welding length and welding has been finished, the welding torch 49 is moved upward in the direction of the arrow $\alpha$ to retreat from the welding line. At this time, the cycle of the automatic tab plate welding operation is finished by returning all the tab plate setting means to their original position.

As explained hereinabove, the automatic tab plate welding apparatus according to the present invention has a construction in which the tab plate setting device having rail slide means and composed of relatively light parts is mounted on the basic truck and is completely separated from the tab plate feeding device and others composed of heavy parts. Therefore, the apparatus according to the present invention has the important advantage over the conventional welding apparatuses of this kind that the considerably reduced weight applied to the means for moving the tab plate setting device makes a smoother operation and more accurate tab plate setting possible.

Further, since the apparatus according to the present invention has a construction capable of obtaining a sufficient depth of penetration solely by utilizing the downward facing welding torch, the apparatus according to the present invention has a high quality welding capability and is suitable for use in a mass production line.

Furthermore, the apparatus according to the present invention provides meritorious effects whereby the tab plate store boxes can be instantly interchanged to feed tab plates without the need for stopping the production line and the welding length can be freely determined in accordance with the width of the tab plate so that tab plates of various widths can be randomly used.

While we have shown and described specific embodiments of our invention, it will be understood that these embodiments are merely for the purpose of illustration and description and that various other forms may be devised within the scope of our invention, as defined in the appended claims.

What is claimed is:

1. An automatic tab plate welding apparatus disposed on each of both lateral sides of a pass line of a first plate for welding a tab plate to a predetermined corner or said first plate, said first plate having a top surface and a bottom surface, said apparatus comprising:
    a first truck disposed above said first plate and movable in a direction perpendicular to said pass line;
    a basic truck disposed below said first plate and movable in a direction perpendicular to said pass line;
    tab plate store boxes mounted on said first truck for holding therein a number of tab plates laid flat on top of one another;
    a tab plate feeding device mounted on said first truck for taking out one tab plate at a time from one of said tab plate store boxes and feeding the tab plate to said basic truck;
    an urging device mounted on said first truck for holding down a predetermined corner of the first plate;
    a torch driving device mounted on said first truck for moving a welding torch pointed at the top surface of the first plate to and along a predetermined welding line;
    a tab plate table mounted on said basic truck so as to be movable horizontally in the direction of the pass line and vertically in a direction perpendicular to the bottom surface of the first plate and swingable in an angular direction inclined to the bottom surface of the first plate for receiving the tab plate from said tab plate feeding device;
    tab plate table positioning means mounted on said basic truck for determining the positional relationship between a predetermined position of an end face of the first plate and an end face of the tab plate on said tab plate table;
    a welding torch positioning means mounted on said basic truck for positioning said welding torch along the welding line in operative association with the horizontal movement of said tab plate table; and
    a sequence device for controlling the order of operation of at least some of the aforementioned devices and means.

2. An apparatus according to claim 1, wherein said apparatus comprises uneven rails, said uneven rails comprising at least one upper rail and at least one lower rail, both of which are positioned perpendicular to the pass line of said first plate, said uneven rails being positioned such that the pass line of said first plate passes between the upper and lower rails, said first truck being mounted movably on the upper rail, said basic truck being mounted movably on the lower rail and said plurality of tab plate storage boxes being mounted so as to be interchangeable with each other in position on said first truck through a turn table.

3. An apparatus according to claim 1, wherein said tab plate feeding device comprises an electromagnet for attracting the tab plate.

4. An apparatus according to claim 1, wherein said tab plate table is made movable horizontally in a direction of the pass line and vertically in a direction perpendicular to the bottom surface of the first plate and swingable in an angular direction inclined with respect to the bottom surface of the first plate by means of a first slide base movable on said basic truck in the same direction as said basic truck, a second slide base movable on said first slide base in a direction perpendicular to the direction of movement of said first slide base, and table lifting and inclining means.

5. An apparatus according to claim 1, wherein a vertically moving unit housing is adapted to have a welding torch extend therefrom, said vertically moving unit housing having a top face which is slidable with guide rails, said guide rails extending forward of and perpendicular to a side face of said first truck, a first slide base movable on said basic truck and a second slide base movable on said first slide base, said welding torch positioning means comprising a guide bar disposed on said second slide base and extending across and above the tab plate table and projecting forward of the first slide base, said vertically moving unit housing having a connecting bar projecting therefrom and said connecting bar having horizontal rollers thereon, whereby said torch driving device moves the welding torch along the welding line by moving said guide rails parallel to the side face of said first truck and whereby when the guide bar is inserted between the horizontal rollers, the vertically moving unit housing moves in response to movement of the second slide base.

6. An apparatus according to claim 5, wherein said guide bar is provided with proximity switches and said connecting bar is provided with a striker, whereby the welding torch moving along a welding line is informed of a welding start point.

7. An apparatus according to claim 4, wherein said tab plate table positioning means comprise a stopper rod disposed upright on an upper surface of said first slide base for stopping a forward movement of said first slide base when said stopper rod is brought into abutment with a side end face of said first plate as said first slide base moves, and an extensible stopper rod disposed upright on the upper surface of said second slide base for stopping a forward movement of said second slide base when said extensible stopper rod is brought into abutment with a front end face of said first plate as said second slide base moves.

8. An apparatus according to claim 7, wherein said tab plate table comprises:
    left and right forwardly inclined vertical roll rows for holding the tab plate on said table therebetween to match a side end face of the tab plate to a forward side face of said stopper rod, one of said rows being movable toward and away from the other to measure the width of the tab plate;
    a pusher for urging the tab plate on the tab plate table from behind into tight abutment with the front or rear end face of the first plate;
    a revolving air hammer having a gate-shaped hammer head disposed across the welding line for striking the ends of both the first plate and the tab plate to correct the difference in level between them; and
    an air cylinder for rearwardly inclining the entire tab plate table.

* * * * *